United States Patent Office 3,526,803
Patented Sept. 1, 1970

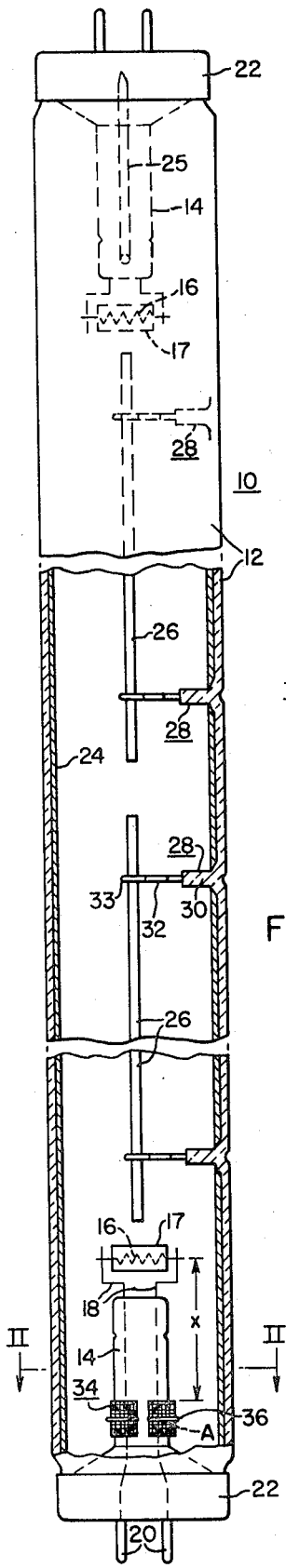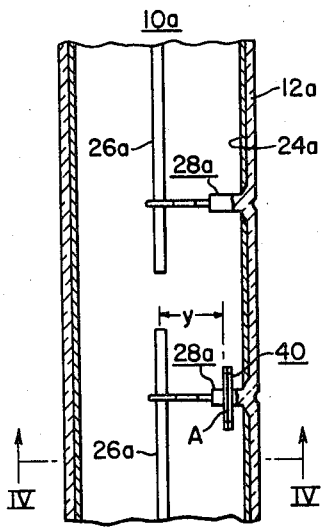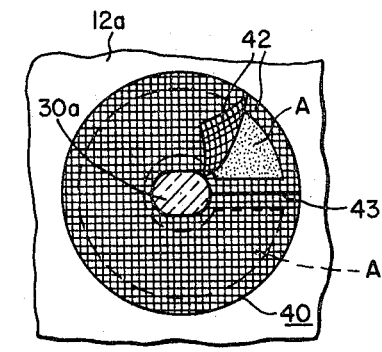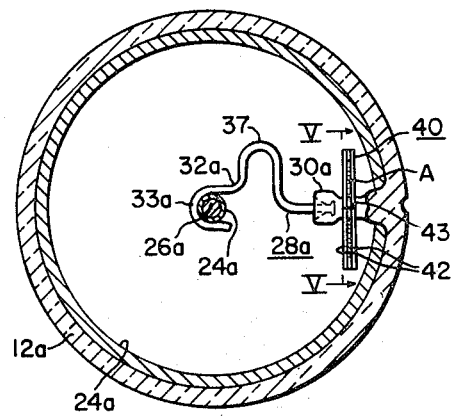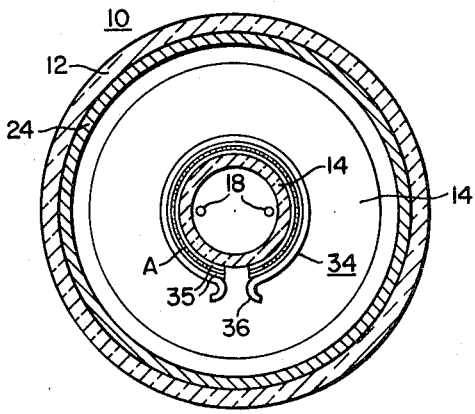
INVENTORS
Albert W. Wainio and
George S. Evans
BY D.S. Bulega
AGENT

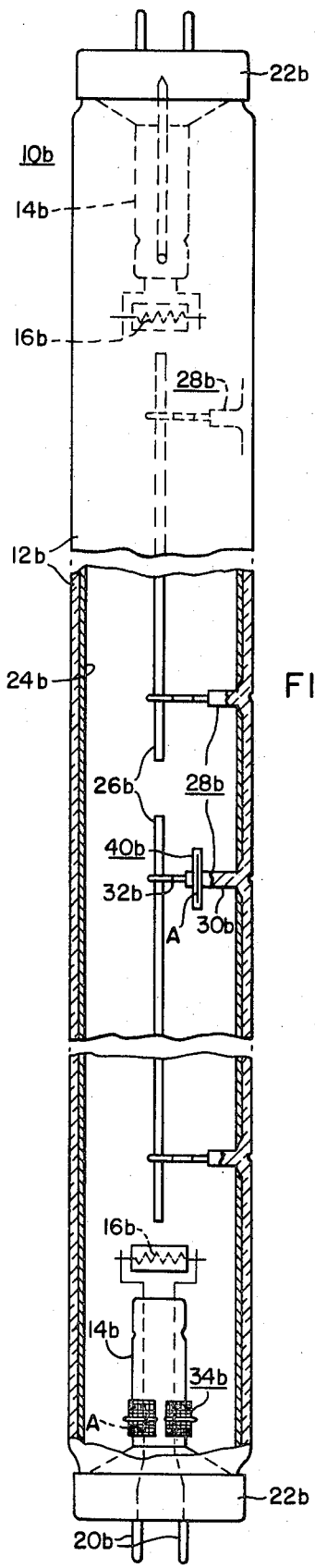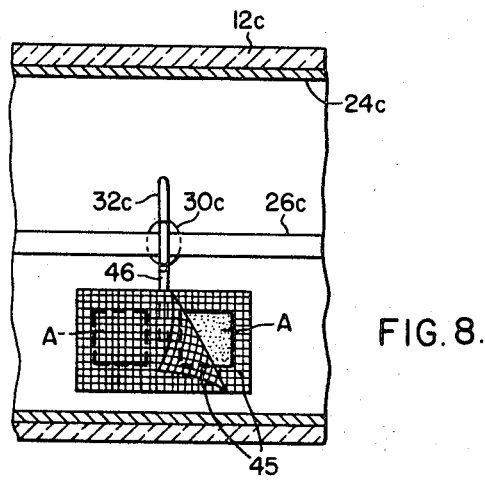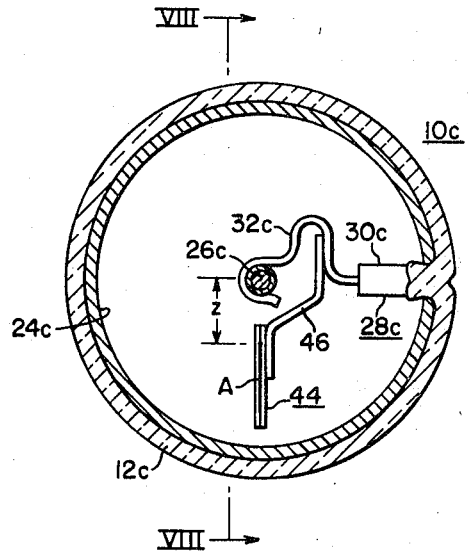

3,526,803
HIGH-OUTPUT FLUORESCENT LAMP WITH AXIAL ROD AND AMALGAM MERCURY-VAPOR CONTROL MEANS
Albert W. Wainio, Livingston, and George S. Evans, Caldwell, N.J., assignors to Westinghouse Electric Corporation, Pittsburgh, Pa., a corporation of Pennsylvania
Filed Jan. 30, 1968, Ser. No. 701,592
Int. Cl. H01j 1/62, 63/04
U.S. Cl. 313—109                                      10 Claims

ABSTRACT OF THE DISCLOSURE

A fluorescent lamp having an axially mounted glass rod in the discharge space, an amalgam of mercury and another metal such as indium that is disposed on an interior part of the lamp structure at a location such that the amalgam controls the mercury-vapor pressure during operation, a neon-argon fill gas, and a T17 envelope (2⅛ inches O.D.) which permit the lamp to be operated efficiently at power loadings of from 25 to 50 watts per foot and at optimum output over a wide range of ambient temperatures. The fill gas pressure is varied within the range of about 1.5 to 3.5 torr and the fill gas contains from 50% to 90% by volume of neon, depending upon the power loading, and the amalgam is located on one of the lamp stems at distances of from 20 to 60 mm. from the adjacent electrode (or attached to one of the rod supports at distances of from 5 to 20 mm. from the bulb axis), depending upon the ambient temperature at which peak light output is to be achieved at the selected power loading.

CROSS-REFERENCES TO RELATED APPLICATIONS

The subject matter of this application is related to that disclosed and claimed in the following copending applications:

Application Ser. No. 381,503 filed July 9, 1964 by G. S. Evans and entitled "Mercury Vapor Discharge Lamp and Pressure Regulating Means Therefor";

Application Ser. No. 409,246 filed Nov. 5, 1964 by A. W. Wainio and entitled "Electric Discharge Lamp Having a Resiliently-Suspended Fragile Member Therein That Decreases the Diffusion Length of the Discharge," now U.S. Pat. No. 3,376,456; and Application Ser. No. 524,898 filed Feb. 3, 1966 by G. S. Evans and entitled "Mercury-Vapor Pressure Control Assembly With Segmented Amalgam-Forming Metal."

BACKGROUND OF THE INVENTION

This invention relates to electric lamps and has particular reference to an improved high-output fluorescent lamp that can be operated efficiently and at optimum output over a wide range of ambient temperatures and at power loadings that were impractical heretofore.

Conventional fluorescent lamps are designed to operate at a power loading of approximately 10 watts per foot of lamp length and reach peak light output at an ambient temperature of approximately 80° F. when operated at this loading. In an effort to provide more light with a smaller number of lamps and fixtures, so-called "high-output" fluorescent lamps have been developed and are presently being marketed. These lamps operate at loadings of approximately 25 watts per foot. Since the mercury vapor pressure increases as the loading and operating temperatures of the lamp increase, means for regulating the vapor pressure in such highly-loaded lamps must be provided to prevent excessive vapor pressure and a drop in light output and efficiency. This is achieved in one type of high-output lamp by employing an envelope with shielded "cool" end chambers or other means that maintain the condensed pool of excess mercury at the proper temperature. This, in turn, controls the mercury vapor pressure and keeps within the range required for optimum efficiency and light output (3 to 14 microns, and preferably 6 microns). A more recent development in the art has been to control the mercury-vapor pressure by the use of an amalgam consisting of an alloy of mercury and another metal or metals. Such an amalgam-containing fluorescent lamp is disclosed in U.S. Pat. No. 3,007,071 issued Oct. 31, 1961 to A. Lompe et al.

Another problem encountered in the design of high-output fluorescent lamps is the inherent tendency of the lamp efficiency to decrease as the power input and current density within the discharge are increased. When the current density increases the electron temperatures decreases, resulting in a decrease in the efficiency with which 2537A resonance radiation is produced by the discharge. It has been found that this condition can be remedied by mounting a glass rod, or a similar elongated member, at approximately the axis of the envelope to provide a nonconductive surface in the discharge space at which the electrons and positive ions in the plasma can recombine. This effectively decreases the diffusion length of the discharge and increases the electron temperature without constricting the discharge or interfering with the free passage of the discharge through the envelope. A high-output fluorescent lamp having an axial component that functions in the aforesaid manner is described and claimed in U.S. Pat. No. 3,290,538 issued Dec. 6, 1966 to D. A. Larson and P. J. Walsh.

Another approach to the problem of poor efficiency at high power loadings and current densities is the provision of a re-entrant groove or grooves in the bulb walls. The resulting higher perimeter-to-cross-sectional area ratio of the grooved portions of the bulb increases the radiation efficiency and, thus, the lamp efficiency at a given power loading. A grooved fluorescent lamp of this type is disclosed in U.S. Pat. No. 2,915,664 issued Dec. 1, 1959 to E. Lemmers.

While the aforesaid rod and grooved lamps operate efficiently at power loadings of approximately 25 watts per foot, the condensed pool of mercpry within the lamp overheats when the lamps are operated at higher power loadings or in high ambient-temperature environments such as those encountered in enclosed fixtures. Such overheating raises the mercury-vapor pressure to such a value that the light output and efficiency of the lamp drops off. In addition, it has been found that when the prior art lamps are operated for extended periods of time at loadings of 25 watts per foot and higher, the lumen maintenance decreases quite rapidly, particularly in the case of the grooved lamp.

OBJECTS AND SUMMARY OF THE INVENTION

It is accordingly the general object of the present invention to provide an improved high-output electric discharge lamp that will operate efficiently at various power loadings and with optimum output over a wide range of ambient temperatures.

Another and more specific object is the provision of a high-output fluorescent lamp that is interchangeable with prior art lamps of this type and will produce more light at the same power loading.

Still another object is the provision of a high-output fluorescent lamp that can be readily modified during manufacture to operate efficiently and with enhanced lumen maintenance at loadings in excess of 25 watts per foot and up to approximately 50 watts per foot, and also reach peak output at a preselected ambient temperature.

The foregoing objects and other advantages are achieved in accordance with the present invention by placing a longitudinally-extending member, such as a coaxial glass rod, within the lamp together with an amalgam type mercury-vapor pressure control component and a fill gas of selected composition which cooperate in such a manner that the lamp operates efficiently at loadings of from 25 to 50 watts per foot, reaches peak light output at a preselected ambient temperature, and, if desired, has the same electrical characteristics as prior art high-output lamps. The diameter of the lamp enevelope and the fill gas composition and pressure are also correlated to minimize the deteriorating effect of high operating temperatures and 1850A irradiation on the phosphor and thus enhance the lumen maintenance of the lamp during its useful life.

In accordance with a specific embodiment of the invention, a series of glass rods 1/8 inch in diameter are mounted in tandem axially-extending relation within a T17 envelope (2 1/8 inches outside diameter) that is filled with a neon-argon starting gas that contains from 50% to 90% neon, depending upon the power loading at which the lamp will be operated. An indium-mercury amalgam or other suitable amalgam is attached to one of the lamp stems (or one of the rod supports) at a distance from the adjacent electrode (or envelope axis) such that the amalgam maintains the proper mercury vapor pressure within the lamp when it is operated at a selected ambient temperature. In the case of a lamp intended for operation at a loading of 25 watts per foot, a mixture of 50% argon and 50% neon at a pressure of from about 1.5 to 2.5 torr is used as the fill gas. This lamp has electrical characteristics which match those of conventional high-output and grooved fluorescent lamps now on the market and can, accordingly, be used in the same fixtures and operated on the same ballasts.

In the case of a lamp intended for operation at a loading of 50 watts per foot, the fill gas consists of 80% neon-20% argon at a pressure within the range of about 2.5 to 3.5 torr.

BRIEF DESCRIPTION OF THE DRAWING

A better understanding of the invention will be obtained by referring to the accompanying drawing, wherein:

FIG. 1 is a fragmentary side elevational view, partly in section, of a high-output fluorescent lamp embodying the present invention;

FIG. 2 is an enlarged cross-sectional view through the amalgam-containing end of the lamp, taken along the line II—II of FIG. 1;

FIG. 3 is a fragmentary longitudinal sectional view of a medial segment of an alternative lamp embodiment in which a disc-shaped amalgam component is attached to one of the rod support structures;

FIG. 4 is an enlarged cross-sectional view of the aforesaid alternative lamp embodiment, taken along the line IV—IV of FIG. 3;

FIG. 5 is an enlarged plan view of the disc-shaped amalgam component and associated portion of the bulb as viewed along the line V—V of FIG. 4;

FIG. 6 is a fragmentary side elevational view of another lamp embodiment having one amalgam component attached to one of the lamp stems and an auxiliary amalgam component attached to one of the rod supports;

FIG. 7 is an enlarged cross-sectional view of another lamp embodiment wherein a different type of auxiliary amalgam component is attached to the wire portion of the rod support structure; and FIG. 8 is a plan view of the alternative auxiliary amalgam component and associated rod-support structure as viewed along the line VIII—VIII of FIG. 7.

DESCRIPTION OF THE PREFERRED EMBODIMENTS

While the invention can be used with advantage in various types of low-pressure electric discharge devices, such as germicidal lamps, etc. that contain a vaporizable metal such as mercury and require a controlled metal vapor pressure for optimum output, it is especially adapted for use in conjunction with high-output fluorescent lamps and has accordingly been so illustrated and will be so described.

In FIG. 1 there is shown such a fluorescent lamp 10 which consists of a tubular glass envelope 12 of circular cross-section that is hermetically closed by the usual reentrant glass stems 14 that are sealed to the necked ends of the envelope. Each of the stems 14 support a thermionic electrode 16, such as a tungsten wire coil that is coated with suitable electron-emissive material and is attached to pairs of lead wires 18 sealed through the respective stems. The lead wires are, in turn, electrically connected to a pair of contact pins 20 anchored in base members 22 attached to the sealed ends of the envelope 12. Enlarged metal anodes 17 may also be attached to the lead wires 18 in side-by-side relationship with the respective electrodes 16, in which case the electrodes serve primarily as cathodes when the lamp is operated on alternating current.

The inner surface of the envelope 12 is coated with a layer 24 of ultraviolet-responsive luminescent material, such as a suitable halophosphate type phosphor. The envelope 12 is also charged with an ionizable starting or so-called fill gas which, in accordance with the invention, consists essentially of a mixture of neon and argon at a pressure in the range of from about 1.5 to 3.5 torr and which contains a preselected amount of neon, as will be hereinafter explained. The lamp is exhausted, charged with the fill gas and dosed with a predetermined quantity of mercury in the usual fashion through a tubulation 25 that is attached to one of the stems 14 and subsequently tipped off in accordance with conventional lamp-making practice.

A series of glass rods 26 are resiliently suspended in tandem axially-extending position within the envelope 12 by means of a series of longitudinally spaced support structures 28 that are attached to the envelope wall and extend laterally toward the envelope axis. Each of these support structures 28 consist of a glass spud 30 that is sealed to the inner surface of the envelope 12 and has a resilient wire member 32 embedded in its opposite end, which wire member is formed into a clasp or loop 33 that is firmly clamped around the glass rod at a preselected point. Each of the rods 26 are coated with an ultra-violet-responsive luminescent material or phosphor in order to enhance the light output of the lamp. (A detailed illustration of one of the rod supports is shown in FIG. 4 which depicts an alternative lamp embodiment described below.) A fluorescent lamp having such axially-mounted rods and resilient "strut-like" supporting structures is disclosed and claimed in the aforementioned copending application Ser. No. 409,246 of A. W. Wainio, one of the joint inventors, which application is assigned to the assignee of the present application and is now U.S. Pat. 3,376,456.

The axially-mounted glass rods 26 are of such cross-sectional dimension relative to the envelope 12 that they decrease the diffusion length of the discharge and increase the efficiency with which UV-radiation is generated in accordance with the teachings of the aforesaid U.S. Pat. 3,290,538 of Larson et al.

The mercury-vapor pressure within the lamp 10 during operation is maintained within the desired 3 to 14 micron range by an amalgam-containing component 34 that is attached to the non-tubulated stem 14 of the mount structures by a wire locking ring 36. The component 34 is in the form of a collar that is fabricated from suitable foraminous material, such as wire mesh, and contains a strip or layer of amalgam A. As shown more particularly in FIG. 2, the amalgam A is preferably sandwiched between a pair of larger wire-mesh strips 35 whose edges overlap and, together with the amalgam, form a laminated collar assembly that is locked in encircling relationship on the tubular portion of the stem 14 by the wire ring 36.

The amalgam A can consist of any metal (or metals) that combines with mercury to form an alloy which will be retained on or within the amalgam holder. Experience has shown that amalgam retention at the temperatures which prevail within the lamp can best be achieved by utilizing an amalgam that is partly liquid and partly solid, or in a so-called "two-phase" state, at such temperatures. As a specific example of a suitable amalgam having these characteristics, good results have been obtained by using an indium-mercury amalgam containing from 80 to 95 atom percent indium. Such an amalgam and a wire mesh holder of the aforesaid collar configuration is disclosed and claimed in the aforesaid copending application Ser. No. 381,503 of G. S. Evans (one of the present joint inventors), which application is assigned to the assignee of the present application.

Another suitable amalgam is a triple component amalgam containing predetermined amounts of mercury, indium and tin of the type described in the copending application Ser. No. 678,702 of G. S. Evans et al., filed Oct. 27, 1967 and assigned to the assignee of the present invention.

In accordance with this invention, the amalgam component 34 is located a predetermined distance $x$ from the nearest electrode 16 (see FIG. 1) such that peak light output is obtained at the power loading and ambient temperature for which the lamp 10 is designed, and the neon content of the fill gas and fill gas pressure are also adjusted to achieve optimum production of the phosphor-exciting ultraviolent radiations at the aforesaid selected power loading and also reduce the amount of lamp current required to provide the desired wattage. In addition, in order to inhibit deterioration of the phosphor and improve lumen maintenance the diameter of the envelope 12 is selected to reduce the operating temperature of the phosphor coating 24 and to minimize the intensity of ultraviolet irradiation of the phosphor (microwatts of ultraviolet radiation per square centimeter of phosphor coating). The envelope 12 is also of sufficient diameter to reduce the surface brightness of the lamp 10, an important consideration for lamps of very high output.

Thus, the amalgam-electrode spacing, neon content of the fill gas, fill gas pressure, and the diameters of the envelope 12 and rods 26 are so selected in accordance with the invention that efficient operation and peak output are achieved and maintained at a selected ambient temperature and power loading, without producing glare or an uncomfortably bright light source. As a specific example, excellent results have been obtained in the case as a 96 inch fluorescent lamp designed for operation at 50 watts per foot by using a T17 envelope (2⅛ inches O.D.), glass rods ⅛ inch in diameter, a fill gas of 80% neon-20% argon at approximately 3 torr, and an indium rich amalgam located on the stem approximately 55 millimeters from the adjacent electrode. This particular lamp reached peak output at an ambient temperature of 80° F.

The amalgam-electrode spacing and fill gas composition and pressure can be varied according to the power loading ambient temperature at which peak output is desired. For example, another 96 inch T17 fluorescent lamp having an electrode-collar spacing of 40 millimeters (nominal), rods ⅛ inch in diameter, and a fill gas of 50% neon and 50% argon at approximately 2 torr operated at 25 watts per foot and achieved peak output at 80° F. This particular lamp had electrical characteristics which matched those of conventional high-output and grooved lamps of the same loading and could thus be operated in existing fixtures and on ballasts designed for such conventional lamps. Comparative lamp tests have shown that this improved lamp had a light output which was 10 to 13% higher than a conventional non-grooved high-output lamp and approximately 1000 lumens higher than that of a conventional grooved lamp operated at the same power loading and efficiency.

The fill gas pressure can be varied within the range of approximately 1.5 to 3.5 torr, with higher pressures being used at higher power loadings. The electrode-amalgam spacing can also be varied within the range of from 20 millimeters to 60 millimeters, depending upon the ambient temperature at which peak light output is desired. The neon content of the mixed fill gas can be varied from approximately 50% to 90% by volume for power loadings in the range of 25 watts per foot to 50 watts per foot, the amount of neon being increased proportionately as the power loading is increased.

FIGS. 3–5 EMBODIMENT

In FIG. 3 there is shown another lamp embodiment 10a wherein the mercury-vapor pressure regulating component 40 is attached to one of the rod supporting structures 28a at a predetermined distance $y$ from the envelope axis. Only a medial segment of the lamp 10a is shown since the lamp is identical in all respects with that shown in FIG. 1, except that it does not, of course, have the collar type vapor-pressure regulating component attached to one of the lamp stems.

As shown more particularly in FIGS. 4 and 5, the vapor-pressure regulating component 40 consists of a flat annular body of amalgam A that is sandwiched between two discs 42 of wire mesh that are of the same shape but larger in diameter than the amalgam body. The resulting disc-shaped lamination 40 is slipped over and locked in place on the glass tud 30a of one of the rod-support structures 28a. As will be noted in FIG. 5, the amalgam-wire mesh disc assembly 40 is provided with a slit 43 that extends to a central opening and enables the disc assembly to be slipped over and locked in place on the glass stud 30a. The mesh members 42 are fabricated from wire or other suitable material that has sufficient stiffness to enable the disc component 40 to be locked in place on the glass stud 30a a predetermined distance from the envelope axis and away from the phosphor coating 24a on the inner surface of the envelope 12a.

As shown in FIG. 4, each of the rod-supporting structures 28a consists of the aforementioned glass stud 30a that is joined to the inner wall of the envelope 12a and to a resilient wire 32a having an enlarged spaced end that is embedded in the glass stud. The intermediate portion of the wire 32a is formed into a retroverted bend 37 to provide a shock-absorbing action and the free end of the wire is formed into a clasp 33a that is clamped around and firmly grips the phosphor-coated glass rod 26a in accordance with the teachings of the aforementioned copending Wainio application Ser. No. 409,246.

The spacing between the pressure-regulating component 40 and the envelope axis (dimension $y$ in FIG. 3) can be varied from 5 to 20 millimeters, depending upon the ambient temperature at which peak light output is desired. A 96 inch fluorescent lamp having a T17 envelope, ⅛ inch diameter axial rods, an amalgam components spaced 18 mm. from the envelope axis, and an 80% neon-20% argon fill gas at 3 torr operated satisfactorily at 50 watts per foot and reached peak output at an ambient temperature of about 20° F. This particular construction, accordingly, provided a high-output lamp having characteristics which were suitable for operation at subnormal ambient temperatures.

FIG. 6 EMBODIMENT

In FIG. 6 there is shown another lamp embodiment 10b that is identical to the previously-described embodiment shown in FIG. 1 except that it is provided with two amalgam components—a collar type component 34b that is attached to one of the lamp stems 14b and an auxiliary disc type component 40b that is attached to one of the rod-supporting structures 28b in the manner illustrated and described in connection with the previously described embodiment shown in FIGS. 3 to 5. In contrast to lamp embodiment 10a, however, the disc component 40b is located much closer to the envelope axis and the center of the discharge space so that it will heat up at a much faster rate when the lamp is energized. This closer spacing is achieved by lengthening the glass spud portion 30a of the associated rod-supporting structure 28b and placing the component 40b near the end of the glass spud, as shown. In addition, component 40b contains a smaller quantity of amalgam A than the collar component 34b.

Because it is located closer to the center of the discharge the amalgam A in the auxiliary disc component 40b heats up quickly and provides sufficient mercury vapor to permit the light output to rise rapidly when the lamp is turned on. After it has lost all its mercury the regulation of the mercury vapor pressure is taken over by the larger and cooler body of amalgam A located in the collar component 34b attached to the stem 14b.

FIGS. 7–8 EMBODIMENT

In FIG. 7 there is disclosed an alternative lamp embodiment 10c wherein the auxiliary disc type amalgam component 44 is attached directly to wire portion 32c of one of the rod-support structures 28c by an offset support wire 46 of such configuration that the amalgam A is supported in a plane that passes through the envelope axis and at a location that is much closer to the center of the discharge than in the previous embodiment shown in FIG. 6. With this arrangement the auxiliary body of amalgam A can be located from 5 to 10 mm. (dimension z in FIG. 7) from the envelope axis. When used in conjunction with a primary and much larger and cooler-operating body of amalgam located on the lamp stem (not shown), this construction provides a quicker supply of mercury vapor and a more rapid light-up, even under cold starting conditions.

As shown in FIG. 8, the thermal inertia of the auxiliary source of amalgam A is reduced to a minimum by dividing it into two segments that are sandwiched between two pieces of wire mesh 45. The segments are spaced from one another to provide a central region that is devoid of amalgam and can thus be fastened, as by spot welding, directly to the support wire 46.

It will be appreciated from the foregoing that the objects of the invention have been achieved in that a high-output fluorescent lamp has been provided which not only exhibits improved efficiency and lumen maintenance at high power loadings but which can be readily modified during manufacture and adapted for operation at various loadings and under various operating conditions.

While several embodiments have been illustrated and described, it will be understood that other modifications in the construction and arrangement of the various components can be made without departing from the spirit and scope of the invention.

For example, the amalgam can be retained at the desired location within the lamp by placing it on a single sheet of foraminous material, or even a plate of solid material. Other types of rod supports can also be used and the auxiliary supply of amalgam can be fastened directly to one of the rods by a suitable clamp-support wire.

We claim as our invention:

1. A low-pressure high-output mercury discharge lamp adapted for operation at a power loading of at least 25 watts per foot, said lamp comprising:
   an elongated light-transmitting envelope containing a pair of spaced electrodes and an ionizable fill gas,
   an elongated electrically non-conductive member supported within said envelope and oriented so that at least a portion of said member extends along the discharge path between said electrodes and is located near the center of the discharge space,
   the cross-sectional dimension of said member compared to that of said envelope being such that said member provides a longitudinally extending recombination surface within the discharge space that decreases the diffusion length of the discharge without impeding the free passage of the discharge through said envelope,
   an amalgam within said envelope containing a predetermined quantity of mercury in excess of the amount required to sustain an electric discharge between said electrodes when the lamp is energized, and
   a holder secured to an interior part of the lamp structure retaining said amalgam at a location within the envelope such that the amalgam is spaced from the walls of said envelope and both of said electrodes and thereby maintains the mercury vapor pressure within preselected limits when the lamp is operated at said power loading.

2. The discharge lamp of claim 1 wherein;
   said elongated non-conductive member comprises a rod that is suspended within the discharge space,
   said ionizable fill gas comprises a mixture of argon and neon at a pressure of from about 1.5 to 3.5 torr,
   said fill gas contains from 50% to 90% by volume of neon, and
   the neon content and pressure of said fill gas vary in accordance with the power loading of said lamp in a manner such that the neon content and fill gas pressure both increase from the lower limits of their respective ranges when the power loading exceeds 25 watts per foot.

3. The discharge lamp of claim 1 wherein;
   a layer of ultraviolet-responsive luminescent material is disposed on the walls of said envelope and said lamp thus comprises a fluorescent lamp,
   said elongated non-conductive member comprises a rod of vitreous material that is suspended within the discharge space and is coated with ultraviolet-responsive luminescent material, and
   said ionizable fill gas comprises a mixture of predetermined amounts of neon and argon at a preselected pressure below 5 torr.

4. The fluorescent lamp of claim 3 wherein;
   said lamp is adapted to operate at a preselected power loading in the range of from 25 to 50 watts per foot,
   said neon-argon fill gas contains a predetermined amount of neon that varies generally from about 50 by volume at the lower limit of the aforesaid power loading range to about 90% by volume at the upper limit of said range, and
   said neon-argon fill gas is at a predetermined pressure that varies from about 1.5 torr at the lower limit of said power loading range to about 3.5 torr at the upper limit of said range.

5. The fluorescent lamp of claim 3 wherein;
   said electrodes are located at opposite ends of said envelope and are supported in such position by vitreous stems, and
   said amalgam and holder are located on one of said stems at a predetermined distance from the adjacent electrode.

6. The fluorescent lamp of claim 3 wherein;
   said envelope is of circular cross-section,
   said vitreous rod is held in position within said envelope by longitudinally spaced support structures that are fastened to the inner wall of said envelope, and
   said amalgam-retaining means comprises a holder that is attached to one of said rod-supporting structures.

7. The fluorescent lamp of claim 3 wherein;
   said electrodes are supported at opposite ends of said envelope by mount structures attached to said envelope,
   said amalgam is located on one of said mount structures,
   said vitreous rod is held in suspended position within the envelope by spaced laterally-extending support structures that are fastened to the envelope wall, and a second body of amalgam is supported at a location proximate the envelope axis by means attached to one of said rod-support structures.

8. The fluorescent lamp of claim 3 wherein;
said envelope is of circular cross-section and has an outer diameter of approximately 2⅛ inches,
said rod is also circular in cross-section and is approximately ⅛ inch in diameter and in substantially coaxial relationship with said envelope,
said lamp contains a fill gas of 80% neon-20% argon at a pressure of from about 2.5 to 3.5 torr and is adapted to be operated at a loading of approximately 50 watts per foot,
said electrodes are supported at the opposite ends of the envelope by glass stems, and
said amalgam is located on one of said stems and is spaced approximately 55 mm. from the adjacent electrode.

9. The fluorescent lamp of claim 3 wherein;
said envelope is of circular cross-section and has an outer diameter of approximately 2⅛ inches,
said rod is also circular in cross-section and is approximately ⅛ inch in diameter and in substantially coaxial relationship with said envelope,
said lamp contains a fill gas of 50% neon-50% argon at a pressure of from about 1.5 to 2.5 torr is adapted to be operated at a loading of approximately 25 watts per foot,
said electrodes are supported at the opposite ends of the envelope by glass stems, and
said amalgam is located on one of said stems and is spaced approximately 40 mm. from the adjacent electrode.

10. The fluorescent lamp of claim 3 wherein;
said envelope is of circular cross-section and has an outer diameter of approximately 2⅛ inches,
said rod is also circular in cross-section and is approximately ⅛ inch in diameter and is held in substantially coaxial relationship with said envelope by spaced laterally-extending support structures that are attached to the envelope wall,
said lamp contains a fill gas of 80% neon-20% argon at a pressure of from about 2.5 to 3.5 torr and is adapted to be operated at a loading of approximately 50 watts per foot, and
said amalgam is located on a holder that is attached to one of the rod-supporting structures and is of such configuration that the amalgam is spaced a distance from the envelope axis such that the lamp achieves peak light output at an ambient temperature below 80° F. when the lamp is operated at the aforesaid power loading.

References Cited

UNITED STATES PATENTS

| | | | |
|---|---|---|---|
| 2,173,258 | 9/1939 | Lederer | 313—180 X |
| 2,802,968 | 8/1957 | Knott et al. | 313—179 X |
| 3,160,778 | 12/1964 | Dziergwa et al. | 313—179 |
| 3,373,303 | 3/1968 | Evans | 313—109 |
| 3,376,456 | 4/1968 | Wainio | 313—109 |

FOREIGN PATENTS

| | | |
|---|---|---|
| 1,274,228 | 8/1968 | Germany. |

JAMES W. LAWRENCE, Primary Examiner

D. O'REILLY, Assistant Examiner

U.S. Cl. X.R.

313—179